(No Model.)

E. W. VON SIEMENS, Dec'd.
F. W. WHITRIDGE, Administrator.
METHOD OF AND APPARATUS FOR EXTRACTING GOLD FROM ITS ORES.

No. 601,068. Patented Mar. 22, 1898.

UNITED STATES PATENT OFFICE.

FREDERICK W. WHITRIDGE, OF NEW YORK, N. Y., ADMINISTRATOR OF ERNST WERNER VON SIEMENS, DECEASED.

METHOD OF AND APPARATUS FOR EXTRACTING GOLD FROM ITS ORES.

SPECIFICATION forming part of Letters Patent No. 601,068, dated March 22, 1898.

Application filed May 28, 1896. Serial No. 593,623. (No model.) Patented in Transvaal July 7, 1892, No. 397. 

*To all whom it may concern:*

Be it known that I, FREDERICK W. WHITRIDGE, (administrator of the estate of ERNST WERNER VON SIEMENS, deceased, late of Charlottenburg, Prussia,) a citizen of the United States, residing at New York, in the county of New York and State of New York, do declare the said ERNST WERNER VON SIEMENS to have invented certain new and useful Improvements in the Method of and Apparatus for Extracting Gold from its Ores, (for which Letters Patent have been obtained by the inventor in the Transvaal, No. 397, dated July 7, 1892;) and I do hereby declare the following to be a full, clear, and exact description of the invention, such as will enable others skilled in the art to which it appertains to make and use the same.

This invention relates to the method of and apparatus for extracting gold from its ores, residues, or tailings; and it consists in the novel process and apparatus hereinafter fully described and claimed.

Figure 1:
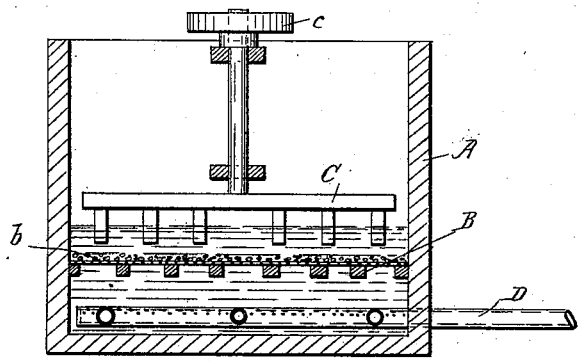
Figure 2:
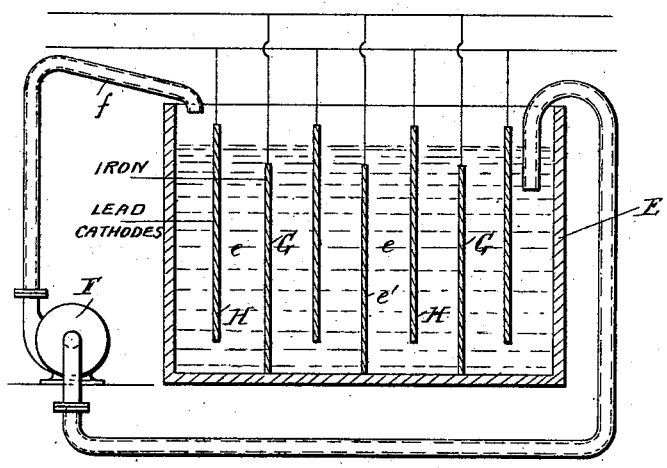

In the drawings, Figure 1 is a vertical section through the vessel in which the gold solution is formed. Fig. 2 is a vertical section through the vessel in which the gold is deposited.

The ore, tailings, or other matter containing gold is first broken up into small pieces in any approved manner.

A is a vessel, of any approved form, provided with a grating B a short distance above its bottom and a perforated plate $b$, resting on the grating. The broken ore is laid on the plate $b$ in a comparatively thin layer and is covered with a weak solution of an alkali cyanid. For this purpose a solution of cyanid of potassium in water of from .05 to .13 per cent. is used.

C is an agitator, of any approved construction, supported in the upper part of the vessel A and provided with means for operating it, such as the pulley $c$.

D are perforated air-pipes in the bottom part of the vessel A under the grating. Air or its equivalent, such as oxygen or ozone, is forced through the pipes D by any approved means. (Not shown in the drawings.) The liquid is agitated above the ore and the air is forced upward through the ore simultaneously.

The gold is dissolved out of the ore according to the following equation:

$$2Au + 4KCy + H_2O = 2KAuCy_2 + 2KOH.$$

The ore is treated from four to six times over with the cyanid solution, and each treatment lasts from five to six hours, so that all the gold may be dissolved out of the ore.

E is the vessel in which the gold is deposited. This vessel may be of any convenient form and is separated into compartments $e$ by partitions $e'$, each alternate partition being provided with an opening at its lower part. The gold solution is let into the vessel E through a suitable pipe $f$ and is caused to circulate continuously through the compartments $e$ by any approved means, such as a pump F. The gold solution is subjected to electrolysis while circulating in the vessel E. If the gold ore is free from base metals or if it has been treated by any of the approved methods for the extraction of base metals or their salts, the electrolyte consists, essentially, of $KCy$, $AuCy + KOH$.

G are the anodes, which are formed of iron, and H are the cathodes, which are formed of lead. The electricity is supplied from any approved generator at a tension of from 3.5 to four volts and a current of from .5 to 1.5 amperes per square meter of surface of the cathodes, and the anodes and cathodes are arranged to have surfaces of very large area, so that the current is diffused over a large surface. The anodes and cathodes are thin plates of about equal area, and the lead plates which form the cathodes are made as thin as possible, so that they may have a very large area without being too heavy. The lead cathodes are preferably arranged at about one and one-half inches apart, and for each ton of gold solution, containing about five pennyweights of gold in the depositing-cell, a cathode-surface of from nine to ten square meters is preferably used.

The gold is deposited at the cathodes, and the cyanogen liberated at the anodes combines with the potassium of the electrolyte and forms cyanid of potassium and cyanate of potash, as set forth in the following equation:

$$\left.\begin{array}{l} \text{KOH} + \text{Cy} \\ \text{KOK} + \text{Cy} \end{array}\right\} = \text{KCy} + \text{KOCy} + \text{H}_2\text{O}$$

When the electrolyte is pure, nearly all the cyanid of potassium is recovered during the electrolysis, no cyanid gas is developed and lost, and the iron of the anodes is not dissolved. When, however, there are any iron salts of pyritic origin in the electrolyte, a portion of the cyanid of potassium is lost and a portion of the iron of the anodes is dissolved. Insoluble cyanids of iron and hydrated peroxid of iron are formed and settled as sludge. This sludge can be treated with strong potash lye, then filtered, evaporated, and the residue melted with potash. By this means cyanate of potash is recovered from the sludge.

The mixture of cyanid of potassium and cyanate of potash formed in the electrolyte is known as "Liebig's alkali-cyanid," and it can be used again in the vessel A for forming the gold solution.

The separation of the gold from the electrolyte is greatly facilitated by keeping the electrolyte in constant circulation and using electrodes with as large surfaces as possible, at the same time using only a weak current, so that the electricity is diffused over a large area.

The lead cathodes containing from two to twelve per cent. of gold are removed from the cell periodically and are smelted and cupelled.

By repeatedly forcing air through the solution in the vessel A and agitating it, as set forth, the gold can be dissolved by a weaker solution than heretofore used.

What is claimed is—

1. The method of extracting gold from a weak cyanid solution, which consists in circulating the solution over anodes of iron and cathodes of lead, said cathodes being formed of thin plates arranged at short distances apart and having from nine to ten square meters of surface for each ton of solution in contact with them; and subjecting the said solution while in motion to an electric current of from 3.5 to four volts and of from .5 to 1.5 amperes per square meter of cathode-surface, substantially as set forth.

2. In apparatus for obtaining gold from a weak cyanid solution by electrolysis, the combination, with a cell provided with anodes of iron and cathodes of lead formed of thin plates, said cathode-plates having from nine to ten square meters of surface to each ton of solution in the cell; of means for circulating the solution in the cell, and means for subjecting the solution to a weak current of electricity, substantially as set forth.

In testimony whereof I affix my signature in presence of two witnesses.

FREDERICK W. WHITRIDGE,
*Administrator of Ernst Werner von Siemens, deceased.*

Witnesses:
DE WITT H. LYON,
JOHN FRENCH.